US 9,223,795 B2

(12) United States Patent
Guo et al.

(10) Patent No.: US 9,223,795 B2
(45) Date of Patent: Dec. 29, 2015

(54) MANAGING NETWORK STORAGE WITH A USER-LEVEL FILE SYSTEM

(71) Applicants: Xiaofeng Guo, Fremont, CA (US);
Yingxuan Kang, Zhangzhou (CN)

(72) Inventors: Xiaofeng Guo, Fremont, CA (US);
Yingxuan Kang, Zhangzhou (CN)

(*) Notice: Subject to any disclaimer, the term of this patent is extended or adjusted under 35 U.S.C. 154(b) by 528 days.

(21) Appl. No.: 13/786,188

(22) Filed: Mar. 5, 2013

(65) Prior Publication Data
US 2014/0258222 A1  Sep. 11, 2014

(51) Int. Cl.
*G06F 17/30* (2006.01)

(52) U.S. Cl.
CPC .... *G06F 17/30174* (2013.01); *G06F 17/30132* (2013.01)

(58) Field of Classification Search
CPC ..................... G06F 17/30132; G06F 17/30174
USPC ......................................................... 707/705
See application file for complete search history.

(56) References Cited

U.S. PATENT DOCUMENTS

| | | | |
|---|---|---|---|
| 6,556,998 B1* | 4/2003 | Mukherjee | G06F 17/30171 |
| 8,082,364 B1 | 12/2011 | Katz et al. | |
| 8,261,265 B2 | 9/2012 | Chen et al. | |
| 8,285,682 B2 | 10/2012 | Oza | |
| 8,312,043 B2 | 11/2012 | van Riel et al. | |
| 8,346,824 B1 | 1/2013 | Lyle et al. | |
| 9,069,792 B1* | 6/2015 | Craighead | G06F 17/30132 |
| 2007/0027929 A1* | 2/2007 | Whelan | G06F 17/30126 |
| 2012/0239492 A1* | 9/2012 | Guo | G06Q 30/02 |
| | | | 705/14.45 |
| 2013/0007504 A1 | 1/2013 | Bodke et al. | |
| 2013/0013727 A1 | 1/2013 | Walker | |
| 2013/0018978 A1 | 1/2013 | Crowe et al. | |
| 2014/0129665 A1* | 5/2014 | Chan | G06F 17/30132 |
| | | | 709/212 |

OTHER PUBLICATIONS

Article entitled "PFC: Transparent Optimization of Existing Prefetching strategies for Multi-level Storage Systems", bvy Zhang et al., dated 2008.*
Weil, Ceph, A Scalable, High-Performance Distributed File System, Oct. 9, 2006, University of California, Santa Cruz, US.
Strauss, Device Transparency: a New Model for Mobile Storage, 2009, Massachusetts Institute of Technology, US.
Filesystem in Userspace, wikipedia, downloaded from: http://en.wikipedia.org/wiki/Filesystem_in_Userspace on Feb. 5, 2013, pp. 1-3, US.

* cited by examiner

*Primary Examiner* — Mahesh Dwivedi (57) ABSTRACT

A user-level file system interfacing with at least one user application for a transparent view with a file system module implemented in a kernel subsystem and a user storage client module implemented in a user-level file system to access and synchronize at least a resource stored within a storage media device, and translating a request, from the user application, to access the resource to the user-level file system for the transparent view. The user-level storage client module receives the request to access the resource from the user application for the transparent view. A storage prediction service retrieves the request to access the resource from the user-level storage client module for the transparent view. The network storage service receives the request to access the resource from the user-level storage client module. The user application is provided with access to the transparent view of requested resource stored within the storage media device.

20 Claims, 7 Drawing Sheets

MANAGING NETWORK STORAGE WITH A USER-LEVEL FILE SYSTEM

TECHNICAL FIELD

This disclosure relates to a network file system, and more particularly, to management of network storage media devices with a user-level file system.

BACKGROUND

A network file system typically includes a collection of computing systems connected to a network that distributes data across a plethora of network storage media devices. The network storage devices may include, for example, network-attached storage (NAS), remote file server, i.e., one using NFS (Network File System) or CIFS (Common Internet File System) protocols, or a remote storage array via a storage-area network (SAN), or via a standard network, e.g., using the iSCSI (Internet Small Computer System Interface) protocol. Further, flash memory could be used to replace the hard disks for network storage media devices. In another example, the system hardware may also include, or is connected to, central processing unit (CPU(s)) which may be a single processor, or two or more cooperating processors in a known multiprocessor arrangement, a microprocessor, or one or more multi-core processors, conventional registers, interrupt handling circuitry, a clock and etc. Accordingly, a network file system may have a large number of network storage media devices.

A computing device may have difficulty accessing and synchronizing resources transparently with a large amount of network storage capacity across various network storage media devices. For example, a computing device may not be able to fully access online storage services which provide network storage capacity due to limited local hardware storage capacity. In addition, online or network storage services are static storage services and do not provide synchronization of data transparently across network storage media devices. In order for a computing device to have access to a large capacity of storage and synchronize resources transparently across a large number of network storage media devices, the computing device may have to mount the file system to its local hardware storage. Furthermore, an administrator or an operating system may have to recognize each change in the data from a network storage media device, thereby increasing latency and complexity. Due to the large number of network storage media devices and synchronization of data transparently across these network storage media devices, a computing device may have a difficult and expensive process of accessing and synchronizing resources transparently across a large amount of network storage media devices.

SUMMARY

In general, this disclosure describes techniques for enhancing the process of accessing and synchronizing any resources transparently across a large number of network or local storage media devices by using a prediction and a caching service interfacing with a user-level file system. In particular, the prediction and caching service may predict and identify storage media devices for user applications to access, and the user-level file system in user space may synchronize communications between the storage media devices, user applications and the prediction and caching service. In addition, the user-level file system in user space may interface with a network storage service and a storage prediction service that may be deployed within a network or integrated in the computing device. As a result, a user application may request access to a storage media device using the user-level file system without the support of an administrator or an operating system. With mounted storage media devices, the user application may access a resource transparently across a large number of storage media devices. Further, the user application may synchronize the resource transparently if any changes occur by using a caching mechanism in conjunction with the network storage service and the storage prediction service. That is, a storage prediction service may predict the next resource to be accessed and synchronize the storage media devices, by prefetching characteristics from the user application and the computing device. With the next resource predicted, the storage prediction service and the network storage service can update and synchronize the storage media devices across the network via the cache. The user application may access the resource transparently and view a complete translation of the storage media devices with real-time updates. This may reduce latency of accessing the resource transparently across a large number of network or local storage media devices, and may reduce the complexity of synchronizing transparently the resource stored within the storage media device that is mounted within the computing device. Further, the user application may access resources from a plurality of storage media devices in a transparent view or translation but not limited by the local storage capacity of the computing device.

For example, techniques of this disclosure may enhance the process of accessing and synchronizing a plurality of resources and network or local storage media devices within a user-level file system. One example is to interface with at least one user application for accessing and synchronizing for a transparent view with a file system module implemented in a kernel subsystem and a user storage client module implemented in a user-level file system to access and synchronize at least a resource stored within a storage media device. Further, the method translates a request, from the user application, to access the resource to the user-level file system for the transparent view, wherein the request to access the transparent view further includes a plurality of operations used to manipulate the resources stored within the storage media devices. The user-level storage client module may receive the request to access the resource from the user application for the transparent view. A storage prediction service may retrieve the request to access the resource from the user-level storage client module for the transparent view. Further, the network storage service may receive the request to access the resource from the user-level storage client module for the transparent view. The user application may be provided access to the transparent view of the requested resource stored within the storage media device, and may further include access to additional resources stored within additional stored media devices.

When the network storage service receives the requests, it may update a cache with metadata pertaining to one or more of the requests, and the network storage may further synchronize one or more of the resources stored within one or more of the storage media devices. Further, the network storage service may update a cache pertaining to changes to the requests and the metadata associated with each of the requests. In addition, the network storage service may maintain the cache pertaining to changes to the transparent view, and synchronize the cache with one or more resources stored with one or more of the storage media devices.

In another example, the user-level storage client module may update the buffer pertaining to changes to the requests and the metadata associated with each of the requests, maintain the buffer pertaining to changes to the transparent view, and synchronize the buffer with one or more resources stored within one or more of the storage media devices. Also, the user-level storage client module may modify at least a logical volume of the file system module to mount the storage media device, authenticate the request for the storage media device from the user application, and may configure the storage media device to mount within the logical volume.

In another example, the storage prediction service may identify the request, and may determine that the request for the storage media device may predict additional requests to access additional storage media devices. Further, the storage prediction service may update the cache with metadata pertaining to one or more additional requests. In addition, the storage prediction service may prefetch metadata associated with the request used to predict additional requests. The metadata may include identification or configuration information pertaining to one or more requests from the user application. Also, the metadata may include identification or configuration information pertaining to each of the storage media devices, and may include synchronization information pertaining to each of the storage media devices.

In another example, a system includes a plurality of managed storage media devices, a plurality of network devices, and a computing device comprising a user interface to interface with at least one user application for a transparent view with a file system module implemented in a kernel subsystem and a user storage client module implemented in a user-level file system to access and synchronize at least a resource within a storage media device. The system further includes a computer-readable medium encoded with instructions for the user application module, a user interface module, the file system module and the user-level storage client module. The system then includes a processor to interface with at least one user application module for a transparent view in a kernel subsystem and a user storage client module implemented in a user-level file system to access and synchronize at least a resource stored within a storage media device, to translate a request to access from the user application to access the resource to the user-level file system for the transparent view, and to receive, by the user-level storage client module, the request to access the resource from the user application for the transparent view, and to provide access, to the user application module, the transparent view of the requested resource stored within the storage media device.

In another example, a device comprising a user interface to interface with at least one user application for a transparent view with a file system module implemented in a kernel subsystem and a user storage client module implemented in a user-level file system to access and synchronize at least a resource stored within a storage media device. The device further includes a computer-readable medium encoded with instructions for the user application module, a user interface module, the file system module and the user-level storage client module. The device then includes a processor to execute the user application module to interface with a transparent view with a file system module implemented in a kernel subsystem and a user storage client module implemented in a user-level file system to access and synchronize at least a resource stored within a storage media device, to translate, a request to access from the user application the resource to the user-level file system for the transparent view, and to receive, by the user-level storage client module, the request to access the resource from the user application for the transparent view, and to provide access, to the user application module, the transparent view of the requested resource stored within the storage media device.

The techniques of this disclosure may provide one or more advantages. For example, the techniques of this disclosure may allow any number of user applications to configure and mount a large number of network storage media devices, or network or local file systems. Further, the user may not need the support of a system kernel, the operating system, or the system administrator because the network storage service device may configure and mount at least one storage media device from the network automatically to the file system. Also, the user application may be unaware of where each network storage media device is deployed in a network because the network storage service device may retrieve the configuration of the storage media devices automatically. The techniques of this disclosure may reduce the time needed to configure and mount a plethora of network storage media devices containing a large capacity of resources. Also the techniques of this disclosure scale well for synchronizing resources between the large number of network storage media devices and the user application. In this manner, the techniques of this disclosure may reduce the complexity of managing network storage media devices, providing network storage prediction, and may reduce the operational costs associated with managing the storage media devices with a plurality of user applications.

The details of one or more examples are set forth in the accompanying drawings and the description below. Other features, objects, and advantages will be apparent from the description and drawings, and from the claims.

DETAILED DESCRIPTION

As used herein a "resource" is an addressable and uniquely distinguishable entity, which may be represented within a network, such as but not limited to, a user, a service, a group, a printer, a server, a website, database, web application such as software as a service (SaaS), platform as a service (PaaS), infrastructure as a service (IaaS) or any other type of cloud computing applications, a tablet, a file, a directory, an image, a video, data, a domain, a computing device, a mobile device, an application, and etc.

Various aspects of this invention discuss the usage of a "file system" (FS). A FS is a software mechanism that defines the way that files are named, stored, organized, and accessed on logical volumes of partitioned memory. The FS is designed to store, organize, manipulate, and retrieve folders, system and data files, and metadata on a plurality of storage media devices.

A virtual file system (VFS) is an abstraction layered on top of a physical FS that permits applications to access different types of defined file systems in a uniform manner. A file system is defined either into the kernel itself or as loadable modules. For example, a VFS can be used to access local or network storage media devices transparently without the client application noticing the difference. Unlike traditional file systems that essentially save data to and retrieve data from a hard disk, VFSs do not actually store data themselves. They act as a view or translation of an existing file system or network storage media device. It can be used to bridge different FSs on various types of kernels, operating systems, web platforms, servers, such as UNIX®, Windows®, Macintosh®, Linux®, iOS®, Android®, Windows Mobile®, BlackBerry®, or other types of operating systems.

Installable File System (IFS) is one example of a loadable kernel module in a Windows® or IBM OS/2®-like operating system (OS) that allows users to add file systems to the kernel without needing to modify the kernel module.

File System in User Space (FUSE) is another example of a loadable kernel module in a Unix®-like operating system (OS) that allows non-privileged users to create their own custom FSs without having to edit or modify the kernel code of the OS. A FUSE module acts as a higher-level bridge to the underlying kernel interfaces of the OS. Thus, FUSE modules may permit the creation and maintenance of VFSs. Any resource available to a FUSE implementation may be mounted within its own FS. The FUSE implementation is one example that the user-level file system of this disclosure is based.

FUSE may include a three-part system. One part may be a file system module loaded within the kernel system. Another part may be a library which manages communications with the file system module in user space. The third part may be a user-supplied module that implements the file system and may implement FUSE operations to the file system and the library module.

Figure 1:
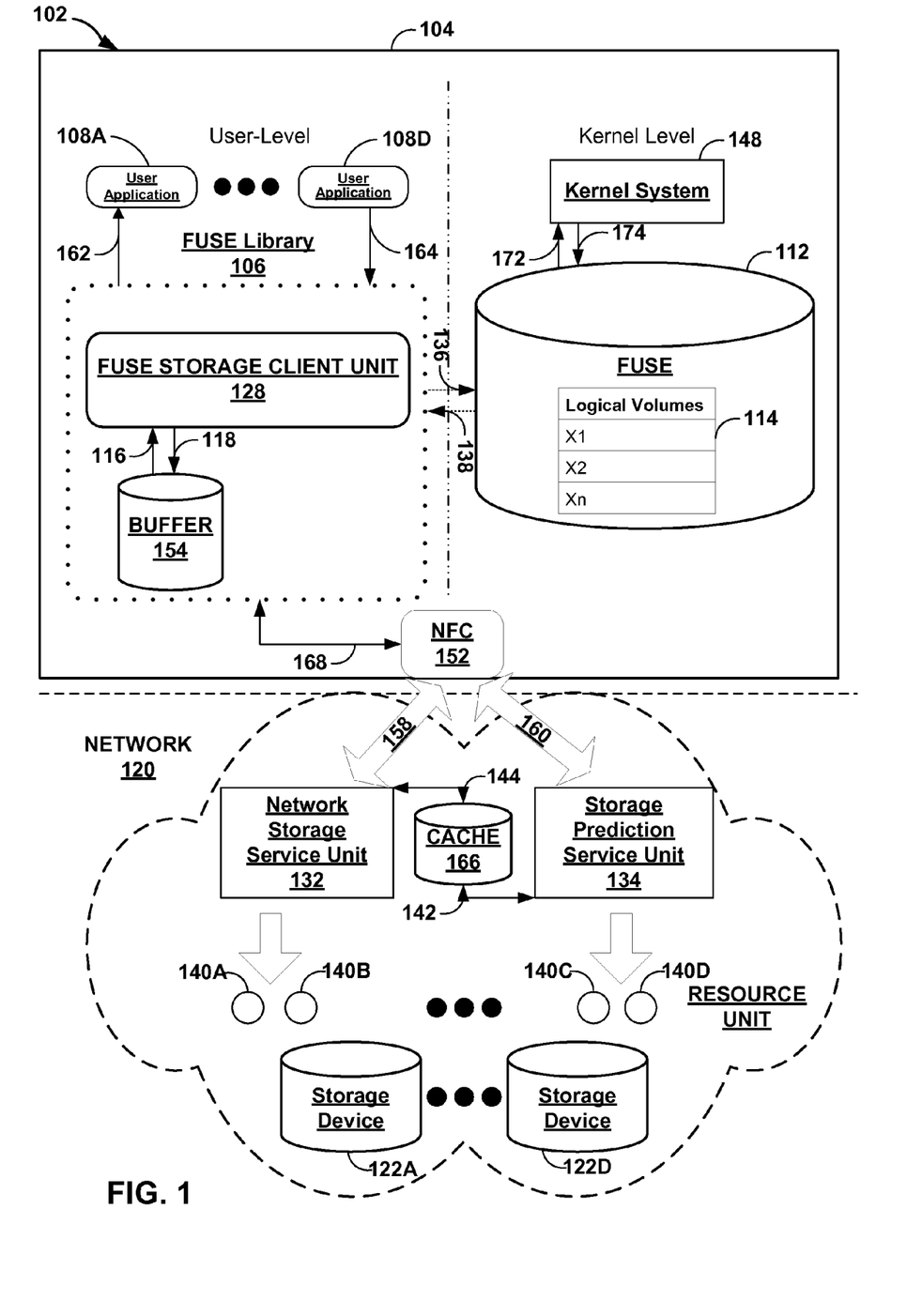
FIG. 1 is a block diagram illustrating an example system in which at least one user application interfaces with a FUSE module for access to local or network storage media devices.

FIG. 1 is a block diagram illustrating an example system 102 in which at least one user application interfaces with a FUSE module for access to local or network storage media devices. A computing device 104 includes at least one user application 108A-108D for interfacing with a FUSE module 106 to request one or more network storage media devices 122A-122D (herein storage media devices 122) or other resource units 140A-140D (herein resource units 140), and to mount at least one storage media device 122 or other resource units 140 to the FUSE file system 112. Moreover, a storage prediction service 134 may, for example, predict additional requests for more storage media devices 122 or other resource units 140 before user application 108 requests the additional storage media device 122. In the example of FIG. 1, system 102 includes a computing device 104 and a network 120.

As described herein, storage prediction service 134 may predict requests by user applications 108 for storage media devices 122 or other resource units 140 and may cache the metadata for further prediction. For example, user application 108 executing a movie may request storage media device 122A that may store part of the movie. However, storage prediction service 134 may predict that user application 108 may request additional storage media device 122B, which may store the remaining part of the movie, and may continue executing the movie. FUSE storage client 128 unit may mount storage media device 122B before user application 108 sends a request based on the prediction from storage prediction module 134.

Computing device 104 includes a mobile or tablet device, a personal computer, a netbook or laptop, a server, a set-top box, or any other type of machine device that may contain a processor, memory, storage, a NFC 152 (Networking Interface Card 152), and a conventional operating system or a collection of software capable of executing a set of instructions (sequential or otherwise) that specify actions to be taken by that computing device 104. The memory may include random-access memory which may be partitioned into a buffer 154, or virtual memory. Virtual memory may include a memory management technique that segregates virtual memory into kernel level or user-level.

Kernel level may include a kernel system 148, a FUSE file system module 112 or other types of kernel level modules or systems. Kernel system 148 may be the main component of an operating system and may bridge software applications and data processing to the hardware devices such as memory, storage or NFC 152. As a central feature of an operating system for storing data, storage may store data using a file system. FUSE file system module 112 may implement a file system module such as a VFS and may allow access to local or network storage media devices transparently without any user applications noticing the difference.

Further, FUSE 112 may bridge the differences in other OS's file systems and user application 108 may access files or data on local file systems of those types of OS's without having knowledge of the underlying file system. FUSE 112 may specify an interface to bridge storage media devices 122 or resource units 140 with kernel system 148 by using logical volume 114. Logical volume 114 may typically be a partition or a collection of partitions, X1, X2, . . . Xn, acting as a single entity that has been formatted with a file system, FUSE 112. That is, logical volume 114 may include multiple partitions with files named, stored, organized and accessed as a partition, and each partition Xn may map to at least one storage media device 122 or another resource unit 140. Each partition Xn of logical volume 114 may contain, for example, files, directories, media, clusters, blocks, metadata, store folders, system and data files, or other file allocation units.

For example, user application 108 executing a network video game may request storage media device 122A, and FUSE 112 may mount storage media device 122A within logical volume 114. Within logical volume 114, FUSE 114 may map storage media device 122A to partition X1. In addition, storage prediction service unit 134 may predict and identify another storage media device 122B and resource unit 140C for user application 108 to access. Network storage service unit 134 may send metadata associated with storage media device 122B and resource unit 140C to FUSE 114. Moreover, FUSE 114 may mount and map storage media device 122B and resource unit 140C to partitions X2 and X3 respectively. Furthermore, user application 108 executing a network video game may have a transparent view or translation of storage media devices 122A, 122B and resources unit 140C, locally as partitions X1, X2, X3, and access data, applications, and files, i.e. such as data files, text documents, spreadsheets, images, videos, or other types of data and media files, and system files, operating system, application binaries, library files, or other types of system files.

User-level may include a plurality of user applications 108A-108D (user applications 108), a FUSE library 106 or other types of application software, programs or libraries that may interact with kernel system 148. User application 108 may include application software, software program or library, application software service, web application software such as software as a service (SaaS), platform as a service (PaaS), infrastructure as a service (IaaS) or any other type of cloud computing applications, a file, a directory, an image, video or audio, media, a domain, and etc. Furthermore, user application 108 may run or execute in user level. To run or execute in user-level, user application 108 may access a transparent view or translation of at least one resource 140 or at least one storage media device 122 from FUSE library 106.

A request may include a digitally time-stamped record containing information to issue an instruction to a computer to retrieve data from a storage media device 122 or other resource 140. The contents of storage media device 122 or other resource 140 remains in its original place. An instruction may be a single operation of a processor within a computer system or an instruction may contain a plurality of functions (e.g., reading, writing, editing, updating data, system files, or interacting with software applications) which may have access to a plurality of storage media devices 122 or other resources 140 in network 120. A request may further include a stand-alone piece of data, containing source, destination, and reassembly information.

User application 108 and FUSE library 106 may interface, via communication links 162 or 164, using operations or function calls as necessary to run or execute in user-level. As user application 108 runs or executes, user application 108 may need to access or synchronize additional resources or data not within the transparent view or translation. To add or edit the transparent view or translation, user application 108 may request from FUSE library 106 for at least one additional resource unit 140 or storage media device 122 to be accessed and synchronize with current resource units 140 or storage media devices 122 within the transparent view or translation.

FUSE library 106 may be a FUSE module that may be implemented into user-level. Furthermore, FUSE library 106 may include a program or library that manages communications with FUSE 112, a FUSE storage client unit 128, user applications 108 or other types of application software, programs or libraries. Also, FUSE library 106 may execute function calls such as read, write, open, delete, rename, create, or any other type of resource unit 140 or storage media device 122 manipulation. Moreover, FUSE library 106 may accept requests from at least one user application 108 and may translate at least one request into a set of functions to mount each request of resource unit 140 or storage media device 122 into a transparent view or translation. The transparent view or translation may interface with logical volume 114 in FUSE 112. User application 108 may access transparently at least one resource 140 or storage media device 122 from FUSE 112. Further, user application 108 may have access to multiple resource units 140 or storage media devices 122 within FUSE 112.

For example, user application 108 may request at least one resource unit 140 or storage media device 122, and may send at least one request to FUSE 112. FUSE library 106 may accept, via communication link 164, the request(s) from user application 108, translate the request(s) and send, via communication link 136, the request(s) along with metadata to FUSE 112. In particular, the requests may be translated into a set of function calls for FUSE 112 to interface with kernel system 148 via communication links 172 or 174. Also, user application 108 may associate metadata with the request. Metadata may refer to structured data that contains or defines other data, making it more discoverable in online environments. Metadata may also provide context to data and may make data easier to reuse and combine with other data. Metadata may also include information about the quality of data. Metadata may further contain synchronization, configuration, identification information, or any other type of metadata information about the request, user application 108, resource unit 140, or storage media device 122. Communication links may be remote procedure calls, application programming interface (API), a message bus, device drivers, VFS interface, network link, gateway, transmission medium, bridge, or any other type of communication system, device interface or network interface.

In another example, FUSE 112 may compare the request(s) received from user application 108 and determine whether at least one resource 140 or storage media device 122 may be mounted to at least one partition Xn in logical volume 114. If the request may be mounted to the partition in logical volume 114, FUSE 112 may return, via communication link 138 and subsequently communication link 162, the request along with the metadata associated with the request to FUSE library 106 and user application 108 for access. If the request(s) is not mounted, FUSE 112 may send, via communication link 138, the request(s) along with the metadata to FUSE storage client unit 128.

FUSE storage client unit 128 may include a user-supplied component which actually coordinates and manages communication between FUSE 112, FUSE library 106, user applications 108, network storage service unit 132, or storage prediction service unit 134. FUSE storage client unit 128 may also update, manage, or synchronize resources and data between buffer 154, user applications 108, or network storage service unit 132, or storage prediction service unit 134. FUSE storage client unit 128 may implement the transparent view or translation when interfacing with FUSE 112, FUSE library 106, user applications 108, or other units.

In another example, FUSE storage client unit 128 may receive, via communication link 138, the request(s) along with the metadata and determine whether the request(s) may be contained in buffer 154, via communication links 118 or 116. If the request(s) is contained with buffer 154, then FUSE storage client unit 128 may send, via communication link 136, the request(s) along with any metadata associated with the request to FUSE 112 to mount the requested resource 140 or storage media device 122. Buffer 154 may be an independent file system which may be integrated into user-level. In particular, buffer 154 may allocate, read, store, write, edit or delete metadata, requests, or any other type of file or system data. Buffer 154 may be a device such as memory, hard disk, CD-ROM, printer, flash, tape drive or any other type of temporary storage of data. If the request is not contained in buffer 154, FUSE storage client unit 128 may send, via communication link 168, the request(s) to network storage service unit 132 or storage prediction service unit 134. NFC 152 may send the request to network storage service unit 132, via physical layer and data link layer 158, or storage prediction service unit 134 via physical layer and data link layer 160.

FUSE storage client unit 128 may also authenticate or encrypt communication between network storage service 132, storage prediction service 134, at least one storage media device 122 or resource unit 140, or the user application 108. Authentication may refer to a security measure designed to establish the validity of a transmission, message, or originator, or a means of verifying authorization of user application 108 to receive specific categories of information. Authentication mechanisms may help ensure that online transactions only involve trustworthy data, hardware, and software for networks and devices. Authentication may involve accepting proof of identity given by a credible entity, comparing the attributes of the object itself to what is known about objects of that origin, or may rely on document or other external affirmations. Authentication may include different types of algorithms or mechanisms implementing these types of security measures.

Encryption and decryption may be used to secure transactions by providing ways to ensure data confidentiality, data integrity, authentication of the message's originator, electronic certification of data, and non-repudiation. Encryption may further provide means of protecting any computer-related communication from wiretapping or interception. Encryption may scramble information generated by user application 108, stored in storage media device 122, or transmitted through network 120 so that the information may only be retrieved in an intelligible form with the key to unscramble it. Methods for encryption may involve symmetric-key or public-key encryption, where common algorithms include AES, Blowfish, DES, Triple DES, Serpent, Twofish, or other types of encryption algorithms.

Network 120 includes at least one storage media device 122 or resource unit 140, at least one network storage service unit 132, at least one storage prediction service unit 134, and at least one cache 166. In this example, network storage service unit 132 maintains, updates, or synchronizes storage media devices 122 or resource units 140. Storage prediction service unit 134 may predict which storage media devices 122 or resource units 140 may be requested by user applications 108, and may identify at least one storage media device 122 or resource unit 140 for access or synchronization.

In another example, user application 108 may be executing a SaaS application where a user may need to access various files, directories, or other various data across a plurality of storage media devices 122 throughout network 120. For instance, the user may be writing a document and saving in it in different directories. Furthermore, as the user accesses more files, directories, and other various data, storage prediction service 134 may predict files or directories that the user may access next, and may identify which storage media devices 122 deployed within network 120 that may contain those files or directories. Moreover, network storage service unit 132 may retrieve those storage media devices 122 for the user and mount them to the file system without the user noticing any performance latency or delays. The user may access a large number of files or directories which may be viewed to the user as locally stored.

Network 120 includes, for example, an internet of interconnected computers and telecommunication facilities including equipment and operating software which may comprise the interconnected world-wide network of networks that may employ Transmission Control Protocol/Internet Protocol (TCP/IP), User Data Protocol (UDP), Asynchronous Transfer Mode (ATM) which includes transmitting and receiving data across a packet-switched data network. Network 120 communicates with different domains, networks, and telecommunication facilities, computing device 104, storage prediction service unit 134, storage media devices 122, resource units 140 or other network devices using optical fiber, Ethernet, Wireless, Bluetooth, cellular, wire, radio, and other methods of communication. Network 120 may also include, for example, subnets of interconnected domains which include, for example, campus networks, wide area networks, virtual private networks, or other types of local or private networks. In this disclosure, the TCP/IP exchanges data through the use of packets. The packets may be used in packet-based or packet-switched networks.

Network storage service unit 132 may return, via physical layer and data link layer 158, the request along with the metadata to FUSE storage client unit 128 via NFC 152. NFC (network interface card) 152 may include a network adapter, network interface controller (NIC), network interface card, LAN adapter or any type of network interface hardware designed to allow computers to communicate over a computer network. The physical layer and data link layer may include standards such Ethernet, Wi-Fi, Token Ring, Bluetooth, Cellular communications, or any other type of computer network communication technologies. Afterwards, FUSE storage client unit 128 may return the request to FUSE 112 to mount storage media device 122 to one or more partitions Xn within logical volume 114. In addition, FUSE storage client unit 128 may update and store, via communication link 118, the request(s) or the metadata associated with the request in buffer 154.

Moreover, FUSE storage client unit 128, may send, via communication link 168, metadata associated with the request to network storage service unit 132 which then may determine whether user application 108 has access to at least one storage media device 122 via cache 166. Network storage service unit 132 may maintain, via communication link 144, cache 166 with metadata and may compare, via communication link 144, the request to the metadata contained in cache 166. That is, network storage service 132 may determine that metadata associated with the request corresponds to at least one resource 140 or at least one storage media device 122 and may be contained in cache 166. Network storage service unit 132 may retrieve, via communication link 144, the metadata associated with the request. Further, network storage service unit 132 may update or synchronize, via communication link 144, cache 166 with the appropriate metadata associated with the request from user application 108.

In a further example, FUSE storage client unit 128 may receive the metadata associated with the request from network storage service unit 132 via NFC 152, and FUSE storage client unit 128 may update and synchronize buffer 154 with the request and the associated metadata corresponding to resource 140 or storage media device 122. FUSE storage client unit 128 returns, via communication link 136, the request to FUSE 112 and FUSE 112 may mount at least one resource 140 or storage media device 122 to one or more partitions Xn within logical volume 114. Once mounted, user application 108 may have access to the requested resource for a transparent view or a translation of at least one resource unit 140 or storage media device 122. User application 108 may be able to make edits, changes, writes, reads, or any other manipulations to the requested resource. FUSE storage client unit 128 may continue receiving, via communication links 116 and 118, updates and synchronizing metadata associated with the requested resource in buffer 154 or network storage service unit 132 via NFC 152.

Network storage service unit 132 performs various aspects of retrieving metadata corresponding to at least one resource unit 140 or at least one storage media device 122. Network storage service unit 132 may receive, via physical layer and data link layer 158, a request for at least one resource unit 140 or storage media device 122 for a transparent view or a translation. Further, storage prediction service unit 134 may retrieve at least one request from NFC 152, via physical layer and data link layer 160, and the metadata associated with the request. In particular, storage prediction service unit 134 may process the metadata associated with the request and identify at least one resource unit 140 or at least one storage media device 122. In addition, storage prediction service unit 134 may predict that user application 108 may request at least one additional resource unit 140 or storage media device 122.

For example, user application 108 executing a network operating system may request files or data stored on storage media device 122 deployed in network 120. With files and data stored on storage media devices 122 deployed in network 120, network storage service unit 132 may retrieve those storage media devices 122 and their associated metadata. That is, user application 108 executing a network operating system may access files deployed in network 120 as if the files may be locally stored in a file system. Furthermore, storage prediction service unit 134 may predict additional requests or identify storage media devices 122 based on characteristics from user application 108 that the network operating system may need to mount before a request is sent. Storage prediction service unit 134 updates cache 166 with metadata associated with storage media devices 122 and network storage service unit 132 may quickly retrieve the metadata from cache 166. User application 108 may quickly receive access to files and data stored on storage media devices 122 based on metadata stored with cache 166.

Storage prediction service unit 134 may include, for example, a dedicated network server, where the network service may continuously analyze data packets and determining whether additional requests may be produced based on a predetermined prefetching rule set. Storage prediction service unit 134 may be connected to network 120 via packet-switched data network. As a software service unit, storage prediction service unit 134 may employ different algorithms or techniques to predict additional requests or identify storage media devices 122 or resource units 140.

Storage prediction service unit 134 may use prefetching such as pure, demand, transparent informed, automatic prediction, or any other type of prefetching algorithms to retrieve continuously metadata associated with the request. Also, storage prediction service unit 134 may implement techniques such as online or offline prefetching algorithms. That is, an algorithm may be online if it must make its decision based only on past history of requests. Whereas, an offline algorithm may use knowledge of the future requests. Storage prediction service unit 134 may update, maintain, or synchronize, via communication link 142, cache 166 with requests and metadata associated with requests, using pattern matching approach to predict additional requests from user application 108.

Storage prediction service unit 134 may also use statistical analysis, hardware prefetching schemes, Markov analysis, probabilistic models, or any other type of prefetching prediction analysis or algorithms to determine additional requests. In addition, storage prediction service unit 134 may swap out, delete old, or remove non-useful, via communication link 142, requests and metadata associated with those requests, and thereby may increase cache 166 performance and timing which user application 108 may perceive as faster resource performance.

Storage prediction service unit 134 may identify one or more storage media devices 122 or resource units 140 based upon characteristics of user application 108, i.e. historical data, specifications and details of computing device 104 and user application 108, type of data, time and date, a data element access service, location, frequency, security, and other types of characteristics, in order to access and synchronize a transparent view of resource units 140. Once identified, storage prediction service unit 134 may store metadata associated with storage media devices 122 or resource units 140 in cache 166 for network storage service unit 132 to send to FUSE storage client unit 128.

Network storage service unit 132 may receive a request from FUSE storage client unit 128, and network storage service unit 132 may configure one or more resource units 140 or storage media devices 122 for the request. In particular, network storage service unit 128 may send, via physical layer and data link layer 158, metadata to FUSE storage client unit 128 to mount requested storage media device 122A. In yet another example, additional requests from FUSE storage client unit 128 may be sent, via physical layer and data link layer 158, to network storage service unit 132 and network storage service unit 132 may further configure storage media devices 122 or resource units 140. Network storage service unit 132 may, also, automatically retrieve storage media devices 122 throughout network 120.

Network storage service unit 132 may include, for example, web storage server, and may provide web application software methods and protocols used for storing data in a web browser. That is, network storage service unit 132 may store persistent data in local storage or session storage. Cache 166 may further include local or session storage. Network storage service unit 132 may retrieve configurations for resource units 140 or storage media devices 122 within network 120 for one or more requests, and may store the configurations as persistent data in cache 166. In one example, storage media devices 122 may include web servers, database servers, file-servers, routers, printers, end-user computers, FTP server, proxy server, remote server, server farm, virtual server, personal digital assistants (PDAs), handhelds, smart phones, tablet computers, disk drives, removable media, thumb drives, memory cards, flash drives, backup tapes, or other types of network storage media devices.

Resource unit 140 may include web share, cloud storage, NFS, AFS, SMB protocols, file-system like clients for FTP and WebDAV, software as a service (SaaS) storage, shared disk file systems, or other types of network or distributed storage systems. Resource unit 140 or storage media device 122 may have configurations associated with each. For example, configuration may include networking protocols, IP addresses, MAC addresses, storage capacity, authentication, authorization, encryption, IPC protocols and communications, or other types of configuration. Configuration may refer to the arrangement of a computer system, application, or component based upon system environment and organizational requirements.

After receiving requested storage media device 122, FUSE 112 may mount requested storage media device 122 within logical volume 114. User application 108 may access the resources contained within requested storage media device 122. For example, the resources contained within requested storage media device 122 may be mounted in FUSE 112, which user application 108 may access data files, program files, media files, operating files, application files, system files, library files, configuration files, or other types of files.

That is, FUSE library 106 creates an association between requested storage media device 122 and other mounted partitions Xn within logical volume 114 of FUSE 112. For example, with respect to mounted storage media devices 122 within FUSE 112, FUSE storage client unit 128 may synchronize metadata files contained within mounted storage media device 122 or resource units 140.

Figure 2:
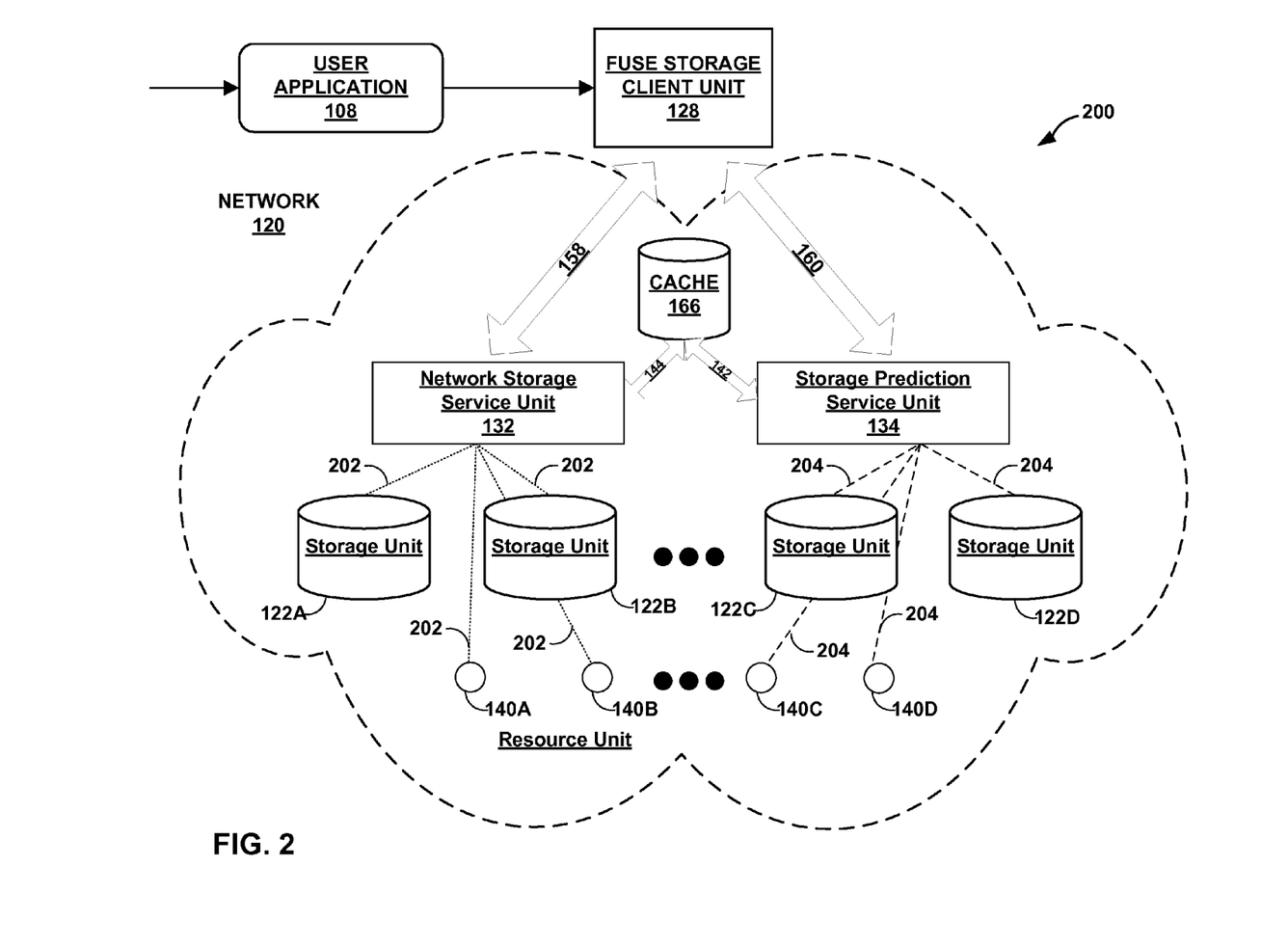
FIG. 2 is a block diagram illustrating an example of network units synchronizing and configuring by network storage service unit or storage prediction service unit.

FIG. 2 is a block diagram illustrating an example of network units synchronizing and configuring with network storage service unit 132 or storage prediction service unit 134. Each unit deployed with network 120 represents one example of an independent unit having a variety of networked resources where network storage service unit 132 or storage prediction service unit 134 may retrieve metadata or configure each unit via communication links 202 or 204.

For the purposes of illustration, user application 108 may request storage media unit 122A or resource unit 140A that may be not mounted to FUSE storage client unit 128. FUSE storage client unit 128 may send the request to storage prediction service unit 134 and storage prediction service unit 134 may, for example, process the request to determine whether storage media unit 122A is mounted and predict whether additional requests may be sent by user application 108. Storage prediction service unit 134 may identify and may retrieve metadata from other storage media units 122 or resource units 140.

Storage media unit 122 may comprise a network storage drive, data storage device, computer storage, or storage media, disk drives, external disk drives, removable media, thumb drives, memory cards, or other types of storage medium with a network interface. Storage media unit 122 may store digital data used for computing, i.e., digital media, digital information, electronic documents, text, spreadsheets, photographs, audio, video or other types of digital data. Further, resource unit 140 may further include application programs or application software relying on an operating system to perform network functions or other types of application software.

Storage prediction service unit 134 may further comprise a web server, proxy server, remote server, root name server, server farm, virtual server, web server, network server, software as a service, web service, web application, mobile application, mobile service, part of a local computing application service, and other types of network service. A web application, for example, may include a machine learning algorithm or a prediction algorithm to determine additional requests sent from FUSE storage client unit 128 based upon identifying metadata of user application 108.

Further, storage prediction service unit 134 may, for example, predict whether additional requests may be sent based upon other characteristics of user application 108 and computing device 104, i.e. source IP address, source port, destination IP address or port, destination service such as WWW or FTP, protocols, TTL values, netblock of originator or of the source, or many other attributes by using machine learning, pattern recognition or prefetching algorithms mentioned above. Also, storage prediction service unit 134 may implement techniques such as online or offline prefetching algorithms. Storage prediction service unit 134 may collect characteristic metadata from connections of resource units 140 or storage media units 122 via communication link 204.

That is, storage prediction service unit 134 makes a connection to each of storage media unit 122 or other resource units 140 via communication link 204 by using networking communications. In particular, storage prediction service unit 134 may evaluate policies, storage content or capacity, administration, encryption, authentication, and other information from storage media units 122 or other resource units 140. Storage prediction service unit 134 may compare information from storage media unit 122 or other resource units 140 with characteristics of user application 108 or computing device 104. Based on the comparison, storage prediction service unit 134 may calculate metadata and information for the prediction algorithms that may be online or offline algorithms. Moreover, storage prediction service unit 134 may predict additional requests from user applications 108 based on metadata calculated from storage media units 122, resource units 140, or other information collected from network 120.

Upon storage prediction service unit 134 predicting an additional request, storage prediction service unit 134 may, for example, identify at least one storage media unit 122 or at least one resource unit 140 corresponding to the additional request. That is, storage prediction service unit 134 may retrieve the MAC (Media Access Control) address, IP address, IP protocols, file-based protocols (e.g., NFS, SMB/CIFS, AFP, or NCP), administration, authentication, authorization, other configuration or identification information related to storage media unit 122 or other resource unit 140. This metadata information may be stored in cache 166 by storage prediction service unit 134 via communication link 142.

For example, storage prediction service unit 134 may identify a network attached storage (NAS) which may be connected to network 120 providing data access to user application 108. User application 108 may access data stored on a NAS and may access another NAS connected to network 120. With that, storage prediction service unit 134 may identify that other NAS based on files related to user application 108 may be accessing. Storage prediction service unit 134 may collect metadata information and predict which other NAS user application 108 may request for access. Further, storage prediction service unit 134 may store metadata associated with the other NAS in cache 166. Subsequently, user application 108 may access to the other NAS before sending a request.

Network storage service unit 132 represents one example of a network management service that provides configuration data corresponding to one or more storage media units 122. For example, network storage service unit 132 may further include servers, workstations, ad server, authentication server, caching server, database server, dedicated server, DNS server, domain name server, e-mail server, file server, ftp server, IRC server, newsgroup server, proxy server, remote server, root name server, server farm, virtual server, web server, network server, software as a service, web service, web application, mobile application, mobile service, or other types of network storage service. Network storage service unit 132 may also include at least one router and network communication link for sharing configuration metadata with, and forwarding configuration metadata to other service units via communication links 202.

Network storage service unit 132 may retrieve identification metadata associated with one or more requests for storage media units 122 from storage prediction service unit 134 via cache 166. Network storage service unit 132 may update, maintain, and synchronize, for example, configuration metadata and the identification metadata associated with one or more requests for storage media units 122 or resource units 140. Network storage service unit 132 may send, for example, the configuration metadata to FUSE storage client unit 128 for access and synchronization of one or more storage media units 122 or resource units 140.

In one example, storage media unit 122 or resource unit 140 may experience changes in network 120. Network storage service unit 132 may continuously and periodically synchronize cache 166 to account for these changes. Moreover, network storage service unit 132 may update metadata pertaining to storage media unit 122 or resource unit 140 in order to replicate any changes in real-time throughout user application 108, FUSE storage client unit 128, and storage media units 122 or resource units 140. User application 108 may, for example, have real-time synchronization throughout network 120. That is, storage media unit 122 or resource unit 140 may change internally while user application 108 has storage media unit 122 or resource unit 140 mounted but user application 108 may have updates in real-time in the transparent view or translational of storage media unit 122 or resource unit 140.

Network storage service unit 132 and storage prediction service unit 134 may periodically or continuously, for example, update metadata associated with one or more storage media units 122 or resource units 140 that may be stored in cache 166. Synchronizing resources transparently across network 120 when storage media unit 122 or resource unit 140 that may be mounted to user application 108, is advantageous in order for user application 108 to reduce application latency, lower bandwidth consumption, and receive real-time updates.

In another example, user application 108 may mount resource unit 140 that may be associated with one or more storage media units 122. In particular, data may be stored in a plurality of storage media units 122 or resource units 140, and user application 108 may access a transparent view of translation of this data. In order words, user application 108 may receive a total or complete view of resource unit 140 but user application 108 may be unaware that data may be stored in a plurality of storage media units 122 or resource units 140. In the background, network storage service unit 132 and storage prediction service unit 134 may continuously or periodically maintain the transparency or translation of resource unit 140 or storage media unit 122.

In another example, user application 108 may mount storage media unit 122 that may have a storage capacity of 2 terabytes. User application 108 may have a transparent view or translation of the entire 2 terabytes despite having a buffer size of 8 gigabytes. User application 108 may, for example, mount several storage media units 122 that collectively have a storage capacity of 20 terabytes. User application 108 may have a transparent view or translation of the entire 20 terabytes despite having a buffer size of 8 gigabytes where each storage media unit 122 may be deployed across network 120. Accordingly, user application 108 may have resources stored in each storage media unit 122 and synchronized the data with real-time changes.

Figure 3:
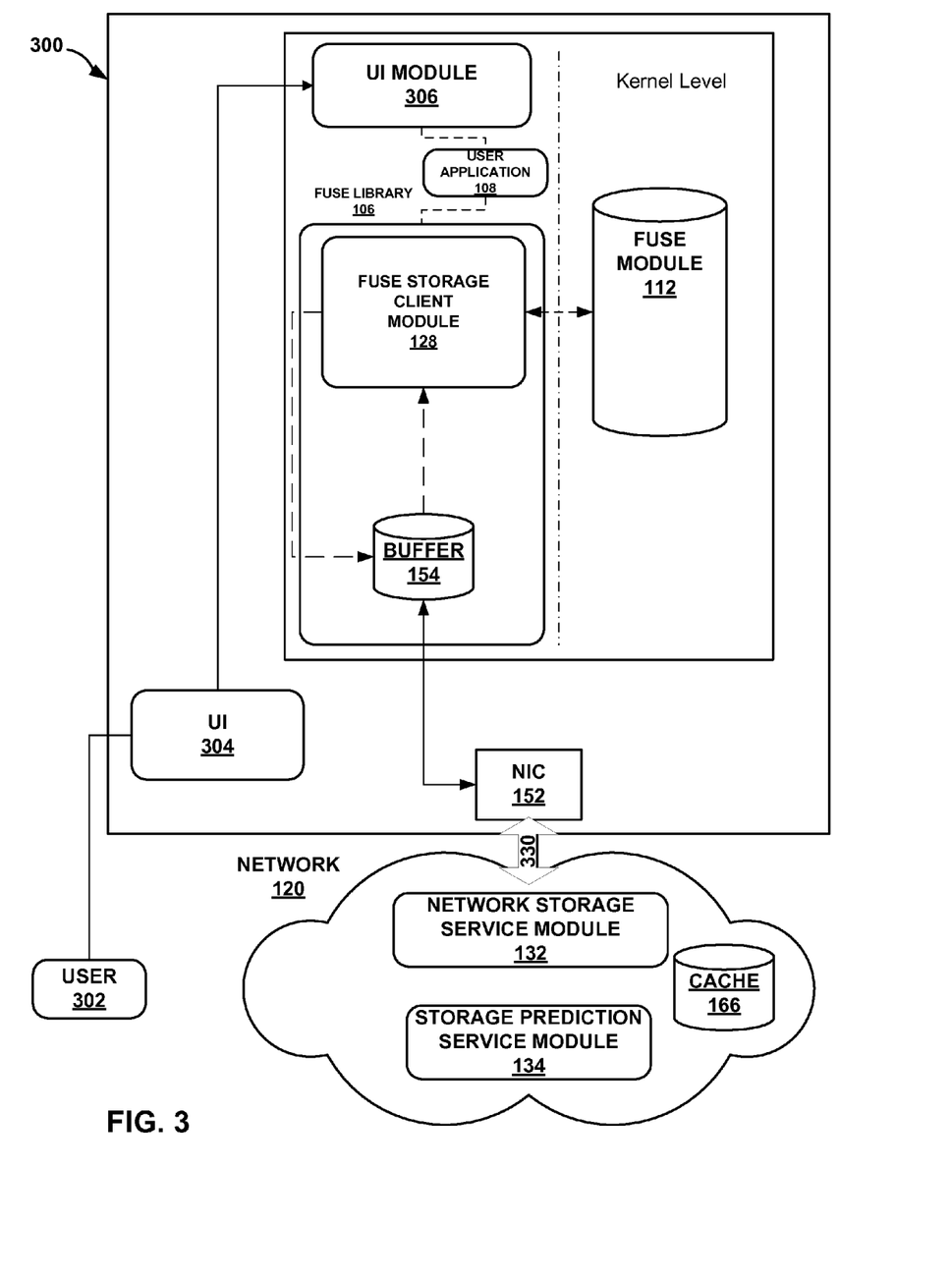
FIG. 3 is a block diagram illustrating an example configuration of modules of a computing device.

FIG. 3 is a block diagram illustrating an example configuration of modules of a computing device. User 302 may interface with user interface 304 corresponding to user interface module 306 to display a plurality of user applications 108. User application 108 displays data or applications for the user 302 which may be stored or contained in FUSE module 112. FUSE storage client module 128 may receive and transmit information or metadata, for example, to FUSE module 112. In an alternative example, FUSE module 112 may receive and transmit information or metadata from FUSE client storage module 128. FUSE client storage module 128 receives and transmits information or metadata from buffer 154 which may contain resources from network 120 via NFC 152 (Network Interface Card).

NFC 152 may receive and transmit configuration information or metadata from network storage service module 132, storage prediction service module 134, or cache 166 via communication link 330. Communication link 330 may further be a communication protocol for exchanging information over network 120. Communication protocol may include Ethernet, internet protocol suite, SONET/SDH, asynchronous transfer mode, HTTP, TCP/IP, wired or wireless technologies, or other types of networking communications. Further, NFC 152 may continuously receive and transmit synchronization information between network storage service module 132, storage prediction service module 134, or cache 166. Any changes that may occur within network 120 or within user application 108 may be updated by FUSE module 112 or buffer 154.

For example, user application module 108 may display an application or data within user interface module 306, and the application or data may be updated within network 120 and cache 166. Network storage service module 132 may send an updated configuration metadata to NFC 152 via communication link 330. Configuration metadata may further include network storage device, IP addresses, the MAC addresses, user identification information and any other type of configuration metadata. Further, NFC 152 may relay the configuration metadata to buffer 154 which may maintain or relay the configuration metadata to FUSE storage client module 128 which may update FUSE module 112. UI module 306, for example, may display an updated application or data for user application 108.

Cache 166 may implement cache replacement strategies algorithms like Belady's algorithm, random replacement, adaptive replacement, Frequency Based Replacement (FBR), Low Inter-reference Recency Set (LIRS), first-in, first-out (FIFO), least recently used (LRU) metadata or other cache optimizing algorithms that a computer program or a hardware-maintained structure may follow to manage a cache of information stored on the computer. When cache 166 is full, the algorithm may choose which metadata to discard to make room for new metadata. Cache 166 may vary in storage capacity.

Buffer 154 may be created within FUSE storage client module 128 of virtual memory which may be implemented as an input/output (I/O) resource and used as a mediating metadata transfer. User application 108 may request at least one resource, and FUSE storage client module 128 may search buffer 154 for the requested resource. Buffer 154 may satisfy the request with metadata associated stored within and FUSE storage client module 128 may not send the request for at least one resource to network storage service module 132. However, FUSE storage client module 128 may send the request for at least one resource to storage prediction service module 134 to update cache 166. Metadata contained within buffer 154 may include configuration metadata to mount storage media device 122 for at least one resource in FUSE module 112. Otherwise, FUSE storage client module 128 may send the request for at least one resource to network storage service module 132 and storage prediction service module 134.

Figure 4:
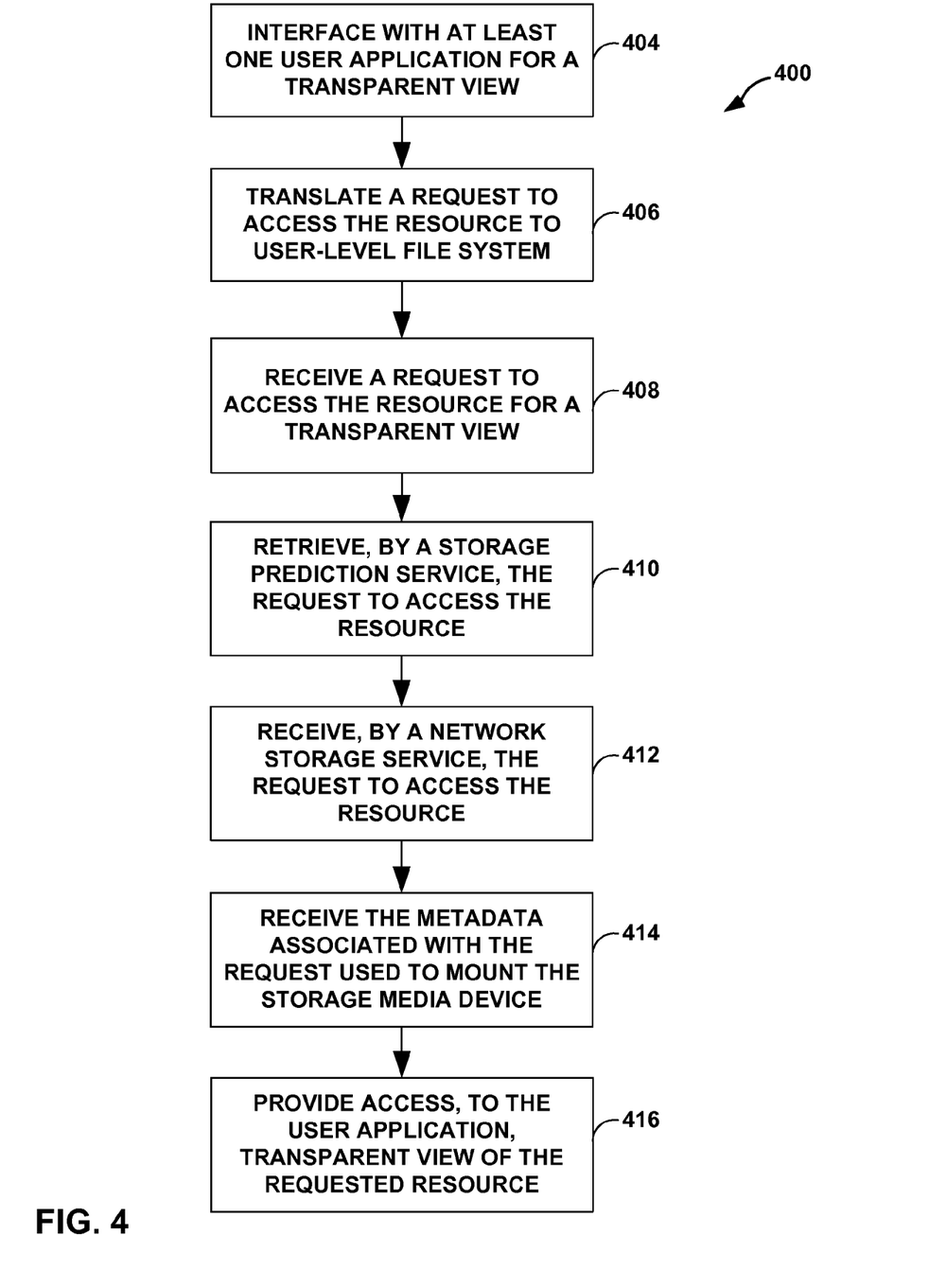
FIG. 4 is a flowchart illustrating a method for displaying, sending, and receiving requests to mount one or more storage media devices.

FIG. 4 is a flowchart illustrating a method for displaying, sending, and receiving requests to mount one or more storage media devices. This example method 402 may be executed by displaying user application 108 of computing device 104 as describe above. When user application 108 requests a storage media device 122 or other resource units 140 for mounting in FUSE 112, user application 108 sends 404 a request to FUSE library 106 to mount at least one storage media device. FUSE library 106 receives 406 the request to mount at least one storage media device 122 or resource unit 140, and FUSE module 112 determines whether the request for storage media device or resource is mounted within logical volume 114. Further, FUSE module 112 may send the request for storage media device 122 or resource unit 140 to FUSE storage client unit 128. FUSE storage client unit 128 may send the request for storage media device 122 to storage prediction service 134 and network storage service 132.

Network storage service 132 and storage prediction service 134 may retrieve the metadata from storage media device 122 within network 120 and send the metadata associated with the request to FUSE storage client unit 128. FUSE storage client 128 may send the request to FUSE module 112 for mounting in logical volume 114. User application 108 may have access to storage media 122 for a transparent view or translation.

Figure 5:
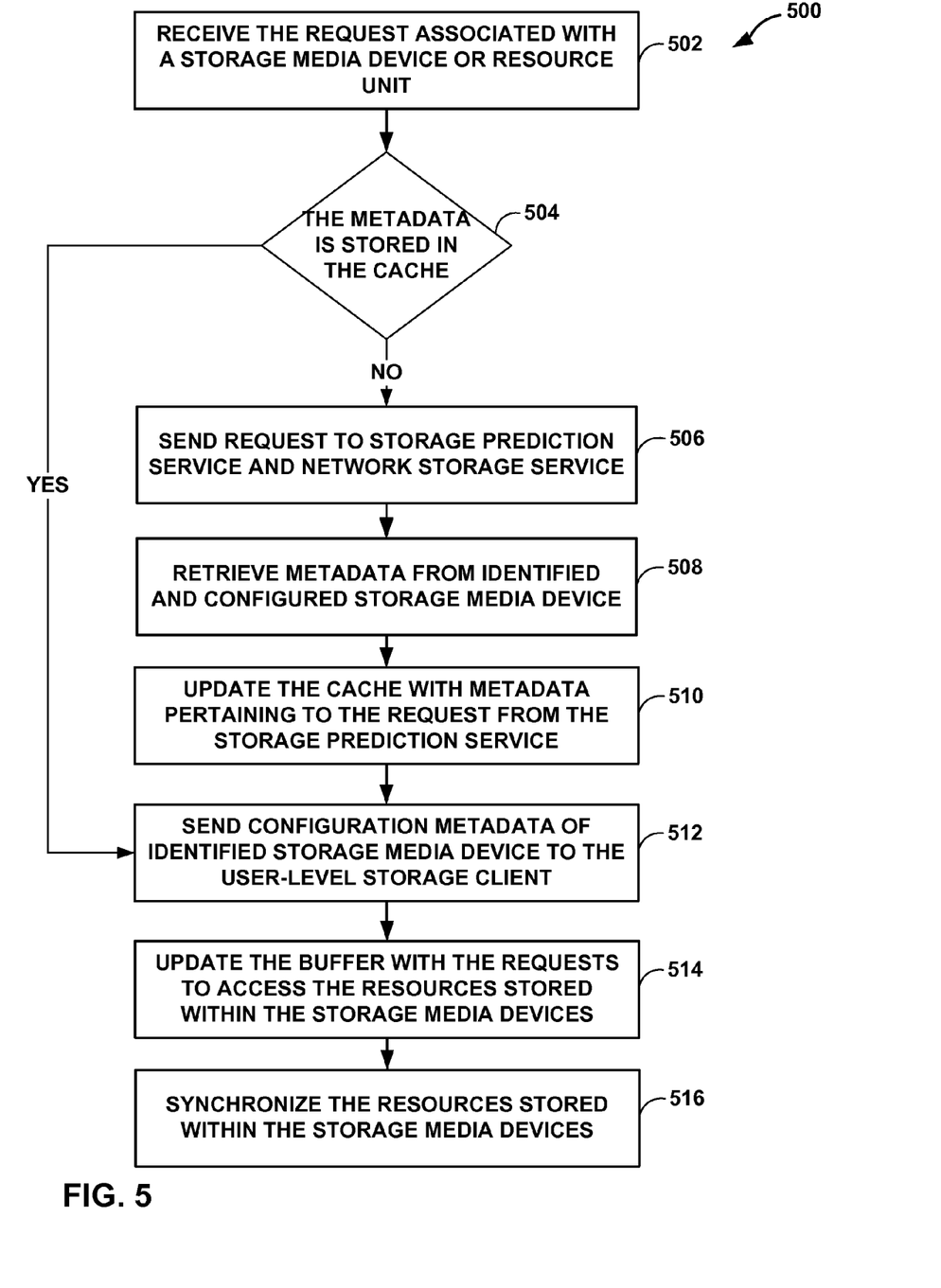
FIG. 5 is a flowchart illustrating a method for sending and receiving configuration for one or more storage media devices from a network.

FIG. 5 is a flowchart illustrating a method for sending and receiving configuration for one or more storage media devices from a network. This method may be executed by a network containing network storage service unit 132, storage prediction service unit 134, and cache 166 as described above. Storage prediction service unit 134 receives 502 the request for a storage media device from FUSE storage client unit 128 and determines 504 whether the request is stored in cache 166. Storage prediction service unit 134 may also process the request to determine whether additional requests may be predicted from FUSE storage client unit 128 based on characteristics of user application 108. If the metadata associated with the request is stored in cache 166, storage prediction service unit 134 and network storage service unit 132 may retrieve the metadata associated with the storage media device 122 and update cache 166. Network storage service unit 132 may send the metadata associated with the storage media device 122 to FUSE storage client unit 128.

If storage prediction service unit 134 predicts that FUSE storage client unit 128 may send additional requests, for example, storage prediction service unit 134 may update and store additional requests and metadata in cache 166 identifying one or more storage media devices 122. If metadata associated with the storage media device 122 is not stored in cache 166, network storage service unit 132 may retrieve identified metadata and configure storage media device 122. Network storage service unit 132 may send configuration metadata identifying one or more storage media devices 122 to FUSE storage client unit 128 to access and synchronize storage media devices 122 for a transparent view or translation. FUSE storage client unit 128 may update buffer 154 and synchronize user application 108 across storage media devices 122.

Figure 6:
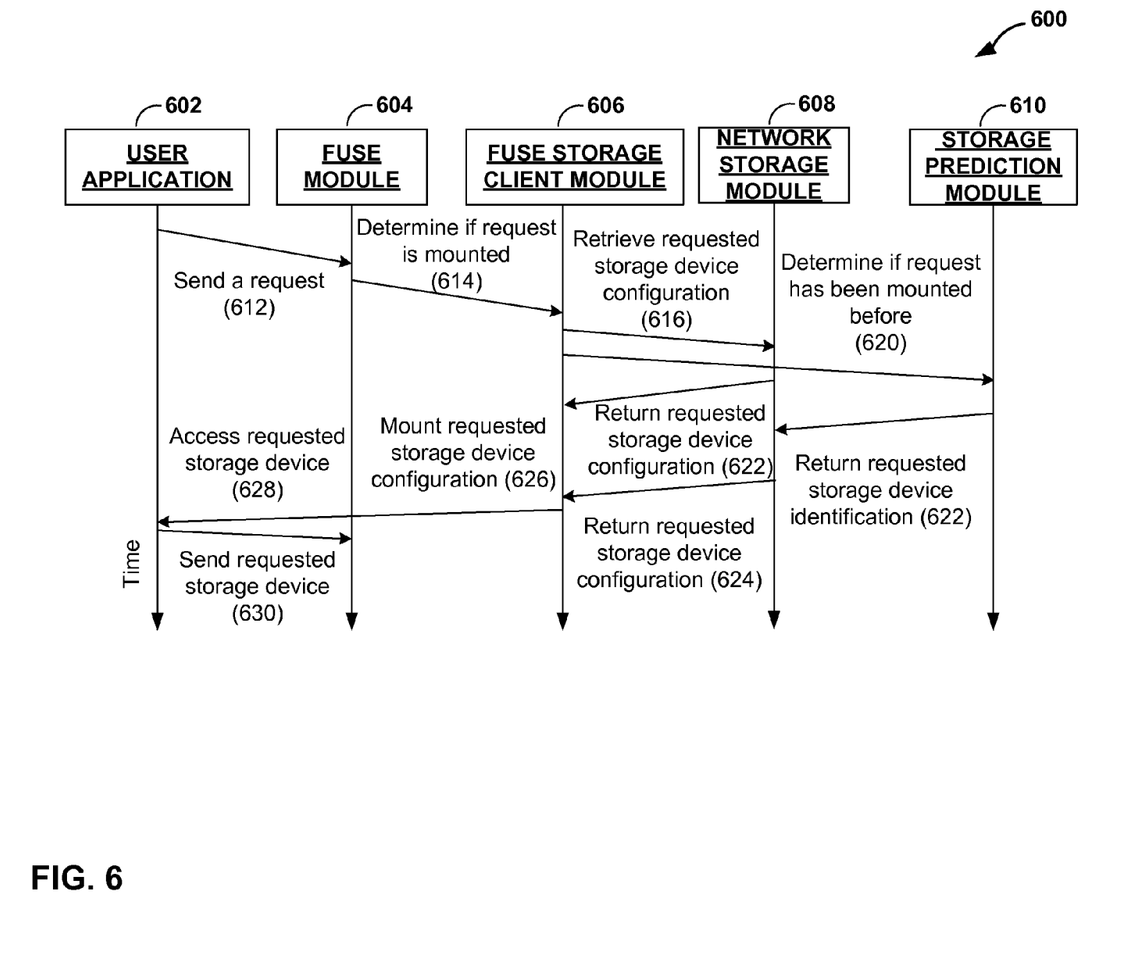
FIG. 6 is a schematic diagram illustrating a method for sending and receiving requests from a user application to a network storage service module and a storage prediction service module.

FIG. 6 is a schematic block diagram illustrating a method for sending and receiving requests from a user application to a network storage service module and a storage prediction service module. The method can be initiated at the start when user application (602) may send a request (612) to FUSE module (604). FUSE module (604) at that time determines whether request (614) is mounted to FUSE module (604) which may prompt FUSE module (604) to send request (614) to FUSE storage client module (606). FUSE storage client module (606) may send a request (620) to storage prediction service module (610) to determine whether a storage media device is mounted to FUSE module (604). In another example, FUSE storage client module (606) may retrieve requested storage media device 122 configuration from network storage service module (608). Storage prediction service module (610) may predict whether additional requests (612) may be received based on user resource (602) identifying characteristics. Storage prediction service module (610) sends requested storage media device identification (622) to network storage service module (608) and network storage service module (608) sends requested storage media device configuration (624) to FUSE storage client module (606). FUSE storage client module (606) may mount the requested storage media device 122 configuration (626) to user application (602). In another example, user application (602) may send returned storage media device configuration (630) to FUSE module (604).

Figure 7:
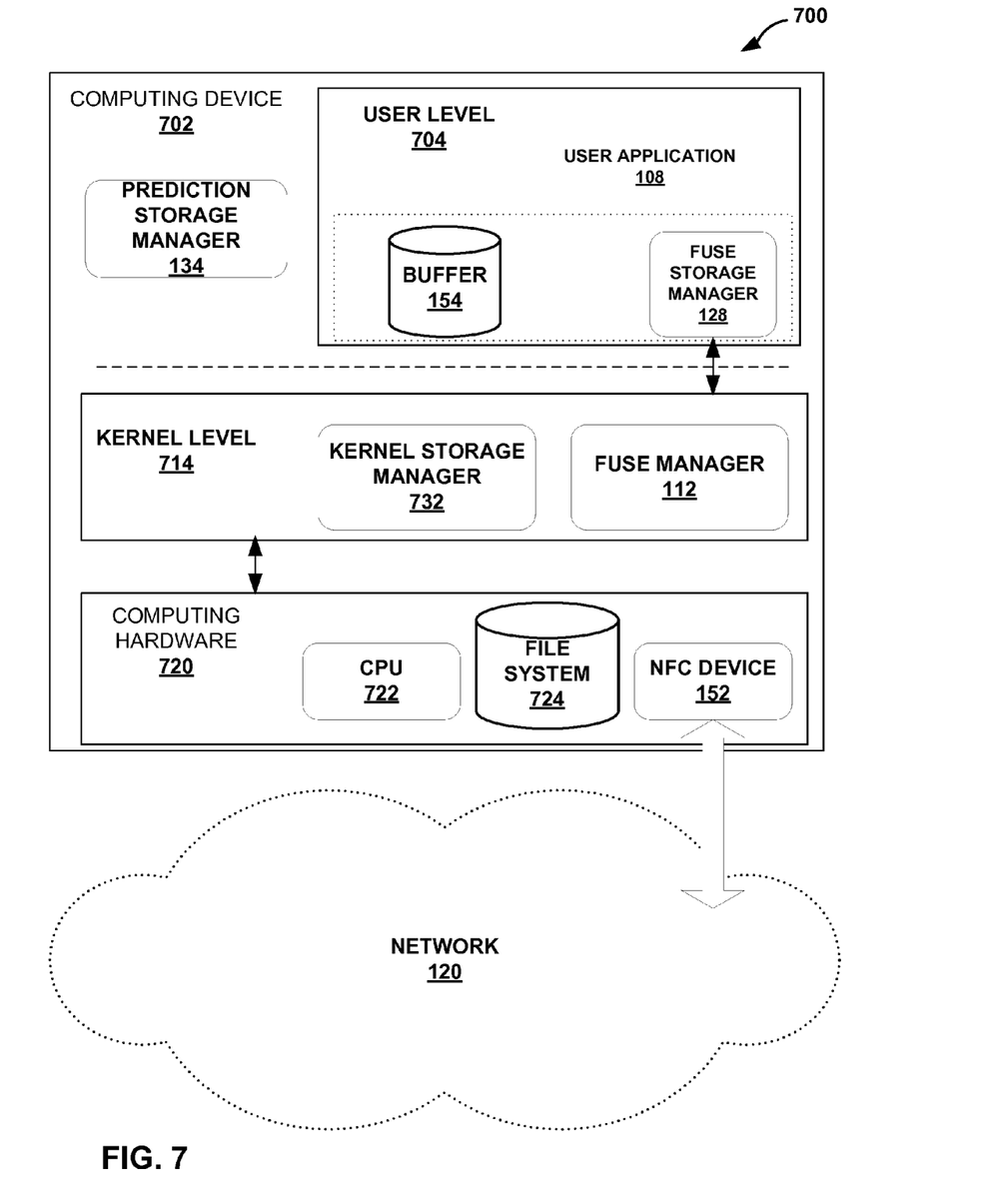
FIG. 7 is a block diagram illustrating an example of a computing device with a user-level system and kernel-level subsystem communicating with a network.

FIG. 7 is a computer system diagram illustrating a computing device with user-level and a kernel level interfacing with a network. In computing device 702, user-level 704 may have access to user application 108 containing, buffer 154, and FUSE storage manager 128. Computing device 702 may include a mobile or tablet device, a personal computer, a netbook or laptop, a server, a set-top box, or any other type of machine device that may contain a processor, memory, storage, a NFC 152 (Networking Interface Card 152), and a conventional operating system or a collection of software capable of executing a set of instructions (sequential or otherwise). In addition, prediction storage manager 134 may be implemented in computing device 702. That is, prediction storage manger 134 may monitor each request and predict additional requests for resources 140 or storage media devices 122 for FUSE storage manager 128. FUSE storage manager 128 may communicate with kernel level 714 via FUSE manager 112. FUSE manager 112 may have access to computing hardware 720 containing CPU 722, file system 724 and NFC device 152. NFC device 152 may transmit and receive requests to and from network 120.

Various examples have been described. These and other examples are within the scope of the following claims.

The invention claimed is:

1. A method comprising:
   interfacing with at least one user application for a transparent view with a file system module implemented in a kernel subsystem and a user storage client module implemented in a user-level file system to access and synchronize at least a resource stored within a storage media device;
   translating a request, from the user application, to access the resource to the user-level file system for the transparent view, wherein the request to access the transparent view further includes a plurality of operations used to manipulate the resources stored within the storage media devices;
   receiving, by the user-level storage client module, the request to access the resource from the user application for the transparent view;
   retrieving, by a storage prediction service, the request to access the resource from the from the user-level storage client module for the transparent view, wherein the request further includes metadata associated with the request from the user application, wherein retrieving further includes processing the metadata associated with the request used to identify the resource stored within the storage media device, wherein processing further includes identifying an additional request to access an additional resource stored within an additional storage media device;
   receiving, by a network storage service, the request to access the resource from the user-level storage client module for the transparent view, wherein receiving further includes metadata associated with the request from the storage prediction service used to mount the storage media device; and
   providing access, to the user application, the transparent view of the requested resource stored within the storage media device, wherein the transparent view further includes access to additional resources stored within the additional stored media devices.

2. The method of the claim 1, further comprising:
   wherein receiving, by the user-level storage client module, further includes a plurality of metadata including metadata associated with the request of the user application,
   wherein receiving, by the user-level storage client module, further includes updating a buffer with one or more of the requests and the metadata associated with each of the request, and
   wherein receiving, by the network storage service, further includes updating a cache with metadata pertaining to one or more of the requests, and wherein the network storage service further includes synchronizing one or more of the resources stored within one or more of the storage media devices.

3. The method of claim 2, further comprising, by the user-level storage client module:
   updating the buffer pertaining to changes to the requests and the metadata associated with each of the requests;

maintaining the buffer pertaining to changes to the transparent view; and
synchronizing the buffer with one or more resources stored within one or more of the storage media devices.

4. The method of claim 2, further comprising, by the network storage service:
updating the cache pertaining to changes to the requests and the metadata associated with each of the requests;
maintaining the cache pertaining to changes to the transparent view; and
synchronizing the cache with one or more resources stored within one or more of the storage media devices.

5. The method of claim 1, further comprising, by the user-level storage client module:
modifying at least a logical volume of the file system module to mount the storage media device;
authenticating the request for the storage media device from the user application; and
configuring the storage media device to mount within the logical volume.

6. The method of claim 5, wherein the logical volume comprises:
a plurality of partitions; and
each partition mounts to one or more of the storage media devices.

7. The method of claim 1, wherein identifying further includes, by the storage prediction service, determining the request for the storage media device to predict additional requests to access additional storage media devices.

8. The method of claim 7, wherein determining, by the storage prediction service, further includes updating the cache with metadata pertaining to one or more additional requests.

9. The method of claim 8, wherein determining, by the storage prediction service, further includes prefetching metadata associated with the request used to predict additional requests.

10. The method of claim 9, wherein the metadata includes identification or configuration information pertaining to one or more requests, wherein the metadata includes identification or configuration information pertaining to each of the storage media devices, and wherein the metadata includes synchronization information pertaining to each of the storage media devices.

11. A system comprising:
a plurality of managed storage media devices;
a plurality of network devices;
a computing device comprising:
a user interface to interface with at least one user application for a transparent view with a file system module implemented in a kernel subsystem and a user storage client module implemented in a user-level file system to access and synchronize at least a resource stored within a storage media device;
a computer-readable medium encoded with instructions for the user application module, the user interface module, a file system module, and a user-level storage client module; and
a processor to execute the user application module to interface with a transparent view with a file system module implemented in a kernel subsystem and a user storage client module implemented in a user-level file system to access and synchronize at least a resource stored within a storage media device, to translate a request, from the user application, to access the resource to the user-level file system for the transparent view, wherein the request to access the transparent view further includes a plurality of operations used to manipulate the resources stored within storage media devices, and to receive, by the user-level storage client module, the request to access the resource from the user application the transparent view, and to provide access, to the user application module, the transparent view of the requested resource stored within the storage media device, wherein the transparent view further includes access to additional resources stored within additional stored media devices;
a network storage service device comprising:
a computer-readable medium encoded with instructions for a network storage service; and
a processor to execute the network storage service to receive the request to access the resource from the user-level storage client module for the transparent view, wherein receiving further includes metadata associated with the request from the network storage prediction service device used to mount the storage media device; and
a network storage prediction service device comprising:
a computer-readable medium encoded with instructions for a storage prediction service; and
a processor to execute the storage prediction service to retrieve the request to access the resource from the user-level storage client module for the transparent view, wherein the request further includes metadata associated with the request from the user application module,
wherein to retrieve further includes to process the metadata associated with the request used to identify the resource stored within the storage media device, wherein to process further includes identifying an additional request to access an additional resource stored within an additional storage media device.

12. The system of claim 11, further comprising:
wherein to receive, by the user-level storage client module, further includes a plurality of metadata including metadata associated with the request of the user application module,
wherein to receive, by the user-level storage client module, further includes updating a buffer with one or more of the requests and the metadata associated with each of the request, and
wherein to receive, by the network storage service, further includes updating a cache server with metadata pertaining to one or more of the requests, and wherein the network storage service further includes synchronizing one or more of the resources stored within one or more of the storage media devices.

13. The system of claim 12, further comprising, by the user-level storage client module:
update the buffer pertaining to changes to the requests and the metadata associated with each of the requests;
maintain the buffer pertaining to changes to the transparent view; and
synchronize the buffer with one or more resources stored within one or more of the storage media devices.

14. The system of claim 12, further comprising, by the network storage service:
update the cache pertaining to changes to the requests and the metadata associated with each of the requests;
maintain the cache pertaining to changes to the transparent view; and
synchronize the cache with one or more resources stored within one or more of the storage media devices.

15. The system of claim 11, further comprising, by the user-level storage client module:

modify at least a logical volume of the file system module to mount the storage media device;
authenticate the request for the storage media device from the user application module; and
configure the storage media device to mount within the logical volume.

16. The system of claim 15, wherein the logical volume comprises:
a plurality of partitions; and
each partition mounts to one or more of the storage media devices.

17. The system of claim 11, wherein identifying further includes, by the storage prediction service, to determine the request for the storage media device to predict additional requests to access additional storage media devices.

18. The system of claim 17, wherein determining, by the storage prediction service, further includes updating the cache with metadata pertaining to one or more additional requests.

19. A device comprising:
a user interface to interface with at least one user application for a transparent view with a file system module implemented in a kernel subsystem and a user storage client module implement in a user-level file system to access and synchronize at least a resource stored within a storage media device;
a computer-readable medium encoded with instructions for the user application module, the user interface module, a file system module, and a user-level storage client module; and
a processor to execute the user application module to interface with a transparent view with a file system module implemented in a kernel subsystem and a user storage client module implemented in a user-level file system to access and synchronize at least a resource stored within a storage media device, to translate a request, from the user application, to access the resource to the user-level file system for the transparent view, wherein the request to access the transparent view further includes a plurality of operations used to manipulate the resources stored within storage media devices, and to receive, by the user-level storage client module, the request to access the resource from the user application the transparent view, and to provide access, to the user application module, the transparent view of the requested resource stored within storage media device; wherein the transparent view further includes access to additional resources stored within additional stored media devices;
a computer-readable medium encoded with instructions for a network storage service; and
a processor to execute the network storage service to receive the request to access the resource from the user-level storage client module for the transparent view, wherein receiving further includes metadata associated with the request from the network storage prediction service device used to mount the storage media device; and
a computer-readable medium encoded with instructions for a storage prediction service; and
a processor to execute the storage prediction service to retrieve the request to access the resource from the user-level storage client module for the transparent view, wherein to retrieve further includes to process the metadata associated with the request used to identify the resource stored within the storage media device, wherein to process further includes identifying an additional request to access an additional resource stored within an additional storage media device.

20. The device of claim 19, further comprising:
wherein to receive, by the user-level storage client module, further includes a plurality of metadata including metadata associated with the request of the user application module,
wherein to receive, by the user-level storage client module, further includes updating a buffer with one or more of the requests and the metadata associated with the request, and
wherein to receive, by the network storage service, further includes updating a cache server with metadata pertaining to one or more of the requests, and wherein the network storage service further includes synchronizing one or more of the resources stored within one or more of the storage media devices.

* * * * *